United States Patent [19]
Karlson et al.

[11] Patent Number: 5,518,698
[45] Date of Patent: May 21, 1996

[54] SWIRL FLOW OZONE GENERATING

[75] Inventors: Eskil L. Karlson, Erie, Pa.; J. Wayne Chamblee, Queensbury, N.Y.

[73] Assignee: Kamyr, Inc., Glens Falls, N.Y.

[21] Appl. No.: 118,793

[22] Filed: Sep. 10, 1993

[51] Int. Cl.$^6$ ............................... B01J 19/08
[52] U.S. Cl. ............... 422/186.18; 422/907; 204/176
[58] Field of Search ............... 422/186.07, 186.18, 422/906, 907; 204/176

[56] References Cited

U.S. PATENT DOCUMENTS

| | | | |
|---|---|---|---|
| 4,141,830 | 2/1979 | Last | 210/63 Z |
| 4,159,971 | 7/1979 | Gneupel | 250/540 |
| 4,417,966 | 11/1983 | Krauss et al. | 204/176 |
| 4,640,782 | 2/1987 | Burleson | 210/748 |
| 4,869,881 | 9/1989 | Collins | 422/186.18 |
| 4,966,666 | 10/1990 | Waltonen | 204/164 |
| 4,983,307 | 1/1991 | Nesathurai | 210/748 |
| 4,988,484 | 1/1991 | Karlson | 422/186.19 |
| 5,236,673 | 8/1993 | Coakley et al. | 422/186.07 |

FOREIGN PATENT DOCUMENTS

| | | |
|---|---|---|
| 0397398 | 11/1990 | European Pat. Off. . |
| 7704401 | 2/1977 | France . |
| 4014168 | 11/1990 | Germany . |
| 1768505 | 10/1992 | U.S.S.R. . |

OTHER PUBLICATIONS

"Design Considerations for Ozone Bleaching," Byrd and Knoernschild, *TAPPI Journal*, May, 1992, pp. 101–106.

*Primary Examiner*—Charles T. Jordan
*Assistant Examiner*—Daniel Jenkins
*Attorney, Agent, or Firm*—Nixon & Vanderhye

[57] ABSTRACT

Ozone is generated from an oxygen-containing gas utilizing a tube-type ozone generator at significantly greater power efficiency. The oxygen is introduced into the annular passageway between the electrodes of the tube-type ozone generator at an angle (e.g. about 45°–90°) so that it swirls in a cyclonic flow path as it travels from one end of the annular passageway to the other. The amount of power consumed to produce a gas having about 8% ozone is roughly half of the power needed if the same conditions are applied but the oxygen gas is introduced conventionally (without swirling action, so that it travels along the dimension of elongation of the passageway). The swirling action also allows a higher concentration of ozone (e.g. 10% or more) to be achieved in the product gas compared to the same conditions when no swirling is employed. Cooling fluid, such as nitrogen gas, may be passed through an interior passageway and outside the outer electrode either co-current or countercurrent to the general direction of oxygen gas flow.

28 Claims, 3 Drawing Sheets

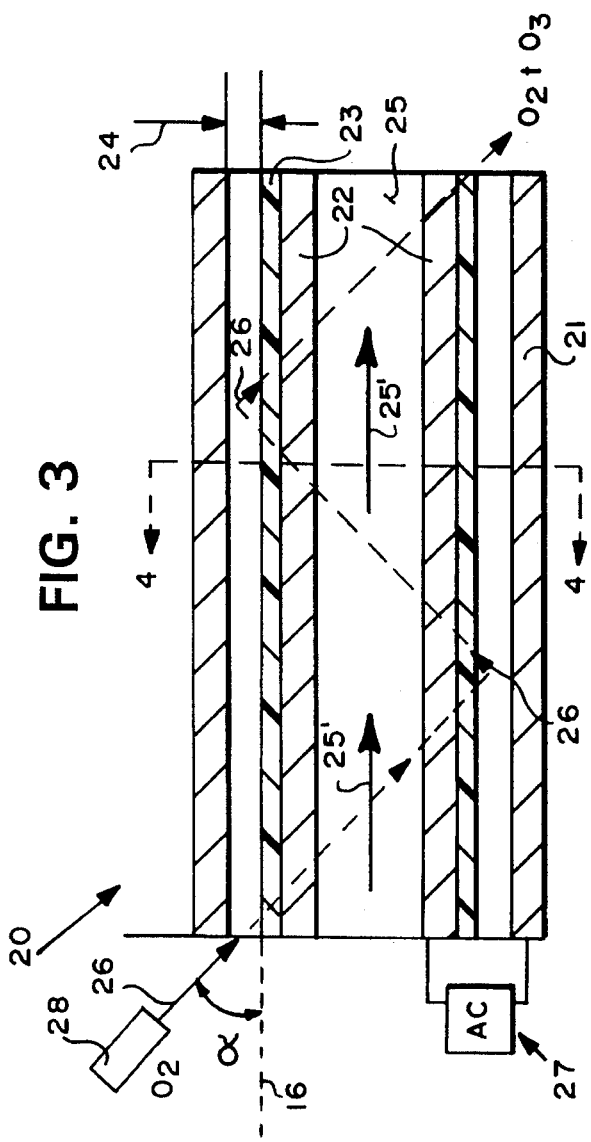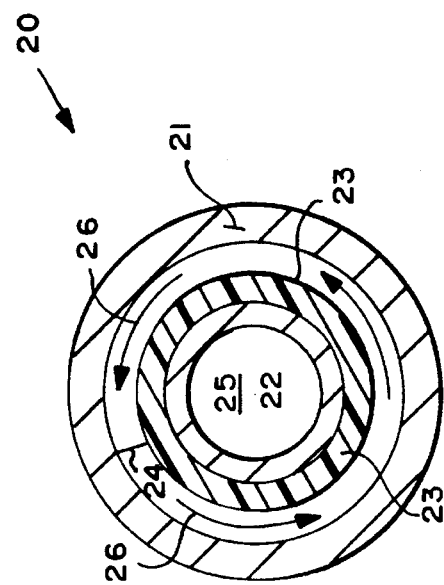

SWIRL FLOW OZONE GENERATING

BACKGROUND AND SUMMARY OF THE INVENTION

The typical way of producing an ozone containing gas is by corona discharge. Typically, oxygen-containing gas, such as air or substantially pure oxygen (i.e. gas having an oxygen concentration of at least about 97%), is passed through the discharge gap of a corona discharge cell, such as shown in FIG. 2 of "Design Considerations for Ozone Bleaching", Byrd and Knoernschild, TAPPI Journal, May, 1992, pages 101–106. In a corona discharge cell ozone is formed by the following reactions:

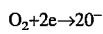

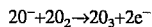

Heat is generated during these reactions, and to prevent thermal decomposition of the ozone, this heat must be removed from the electrodes. Water, oil, or a like cooling liquid is used to cool the generator elements. Power is supplied to the high voltage electrode by means of an AC transformer.

In order to maximize the efficiency of ozone generation and cooling, tube type corona discharge cells have been developed, such as shown in U.S. Pat. No. 4,988,484, the disclosure of which is hereby incorporated by reference herein. Conventional tube-type ozone generators have an inner electrode, an outer electrode, a dielectric between the electrodes, either on the inner electrode or the outer electrode, and an annular passageway defined between the electrodes and dielectric. The annular passageway is typically linear and elongated in a dimension of elongation. An inner passageway is also provided interior of the inner electrode and substantially concentric therewith, and a cooling fluid (such as nitrogen gas, water, oil, or other cooling fluid) passes over the external electrode and through the interior passageway. The tubes are typically enclosed within a housing, and are disposed in banks, such as seen in FIG. 3 of U.S. Pat. No. 4,988,484.

In conventional tube-type ozone generators, oxygen-containing gas is introduced into the annular passageway so that it flows in the dimension of elongation of the annular passageway (i.e. makes substantially a 0° angle with respect to the dimension of elongation). It is heretofore not been recognized that the manner in which the oxygen-containing gas is introduced into the tube-type generator could have any effect on the generator's power efficiency, or on the ability of a given generator to produce a particular concentration of ozone in the product gas. However, surprisingly, according to the present invention it has been found that the manner in which the gas is introduced into the annular passageway, and flows in the passageway, can have dramatic effect on power efficiency and/or the concentration of ozone in the product gas.

There are some uses of ozone in which the efficiency of ozone generation and the amount of ozone in the product gas are important to the practical success of the process utilizing the ozone. For example in the bleaching of cellulose pulp with ozone, especially in the bleaching of medium consistency pulp such as shown in European patent publication 0397308, it is necessary to maximize both the efficiency of the ozone generation, and the amount of ozone that can be provided in the product gas stream. Typically, ozone concentrations of at least 8% in the product gas are desirable, while ozone concentrations of 10% or more are preferred.

Another use of ozone is in the purification of potable water and other water supplies.

According to the present invention it has been found that by simply passing the oxygen-containing gas through the annular passageway of a tube-type ozone generator so that the gas "swirls" in a cyclonic flow pattern as it passes through the annular passageway (that is, rotates around an axis defined by the dimension of elongation as it substantially linearly moves in the dimension of elongation), the power efficiency of the tube-type ozone generator can be dramatically improved, at least about 10%, and typically about 50% for the production of product gas having an ozone concentration of about 8%. Also, the simple swirling movement of the oxygen gas in the tube-type generator allows the same generator (with the same flow, power, and other conditions) to produce a product gas having a higher concentration than is possible under identical operating conditions if the swirling action (cyclonic flow pattern) is not utilized, ozone concentrations of 10 to 13%, or possibly even more, being achievable according to the invention.

According to one aspect of the present invention a method of generating ozone from an oxygen-containing gas utilizing a tube-type generator having an inner electrode, outer electrode, and dielectric associated with one or both of the electrodes, and defining an annular passageway elongated in a dimension of elongation, is provided. The method comprises the steps: (a) Passing oxygen-containing gas through the annular passageway so that the gas makes an angle of greater than 0° and less than 90° with respect to the dimension of elongation so that the oxygen-containing gas swirls as it travels in the dimension of elongation; and (b) applying electrical power to the electrodes to create a corona discharge to generate ozone from some of the oxygen in the oxygen-containing gas, a product gas having at least one percent ozone being discharged from the generator. Step (a) is typically practiced by passing essentially pure oxygen through the annular passageway, although ambient air can also be used as the oxygen-containing gas if low ozone concentrations are acceptable.

Step (a) is typically practiced so that the amount of power applied in step (b) to produce a given quantity of ozone in the product gas is at least about 10% less than if step (a) were practiced by introducing the oxygen-containing gas so that it flowed in the dimension of elongation, without swirling, with all other conditions the same. In fact, step (a) may be practiced so that when the product gas has an ozone concentration of about 8% the amount of power utilized in the practice of step (b) is roughly about 50% less than if step (a) were practiced by introducing the oxygen-containing gas so that it flowed in the dimension of elongation, without swirling, with all other conditions the same.

Optimum results are typically achieved if the oxygen-containing gas makes an angle of about 45°–90° with respect to the dimension of elongation. Step (b) is typically practiced by applying AC power having a frequency of at least about 50 Hz, for example about 50–2500 Hz (e.g. about 450 Hz). Steps (a) and (b) may be practiced so that the product gas has an ozone concentration of at least about 10%. The orientation of elongation of the annular passageway is not critical and may be horizontal, vertical, or anything in between.

Typically, the generator has an interior passageway substantially concentric with the inner electrode and there is the further step, commensurate with the prior art, of passing a cooling fluid, such as nitrogen gas, water, oil, etc., through the inner passageway, either co-current or countercurrent to the general direction of the oxygen gas flow through the annular passageway.

The invention also contemplates a method of generating ozone containing gas utilizing a tube-type ozone generator, comprising the following steps: (a) Introducing essentially pure oxygen gas into the passageway so that it flows from the first end of the passageway to the second end. (b) Applying AC power to the generator electrodes so as to produce a corona discharge causing some of the oxygen flowing in the passageway to be transformed to ozone, so that a product gas is produced having ozone therein. And, wherein steps (a) and (b) are practiced so that the product gas has an ozone concentration of at least about 8% at a power cost of less than about ten kw/kg/hr. The method is particularly suitable for generating ozone for use in ozone bleaching, including bleaching of medium consistency (e.g. about 8–15%) paper pulp, in which an ozone concentration of at least about 8% is desirable, and for which the power efficiency is important in order to achieve commercial practicality or optimization. In fact, step (a) may be practiced so that the power cost to produce product gas containing at least about 8% ozone is roughly about 50% of the power cost to produce product gas with that concentration of ozone using the same generator under the same conditions only with the oxygen gas flowing substantially in the direction of elongation without swirling.

According to yet another aspect of the present invention an ozone generator is provided comprising the following elements: An inner electrode. An outer electrode. A dielectric associated with one or both of the electrodes. The electrodes and dielectric defining an annular passageway having a first end and a second end spaced from each other in a direction of elongation. Means for introducing oxygen-containing gas into the first end of the annular passageway so that it makes an angle of greater than 0° and less 90° with respect to the direction of elongation, so that the introduced oxygen-containing gas swirls in the annular passageway as it passes from the first end to the second end thereof. And, means for applying AC power to the electrodes.

The means for introducing the oxygen-containing gas may comprise a nozzle, a plurality of nozzles, a header, slots, channels, orifices, or the like, disposed at an angle with respect to the direction of elongation corresponding generally to the angle that the gas assumes as it swirls in an annular passageway. Typically, the means for introducing the oxygen-containing gas comprises means for introducing the gas at an angle of about 45° to 90° with respect to the angle of elongation. As is conventional per se in the prior art, an interior passageway substantially concentric with an interior of the inner electrode is provided as well as means for circulating a cooling fluid through the interior passageway and externally of the outer electrode. The dielectric may be on the inner electrode, or on the outer electrode or on both electrodes, between the inner and outer electrodes. The electrodes are typically made of stainless steel and the dielectric is typically made of glass or ceramic, although other materials can be used for both. The means for applying AC power to the generator comprises means for applying power at a frequency of about 50–2500 Hz.

It is the primary object of the invention to produce ozone from oxygen-containing gas in an efficient manner, and/or to produce ozone containing gas having a higher concentration of ozone than is possible utilizing the same conditions and conventional equipment. This and other objects of the invention will become clear from an inspection of the detailed description of the invention, and from the appended claims.

BRIEF DESCRIPTION OF THE DRAWINGS

FIGS. 3 and 4 are views like those of FIGS. 1 and 2 only showing a tube-type ozone generator according to the present invention.

DETAILED DESCRIPTION OF THE DRAWINGS

Figure 1:
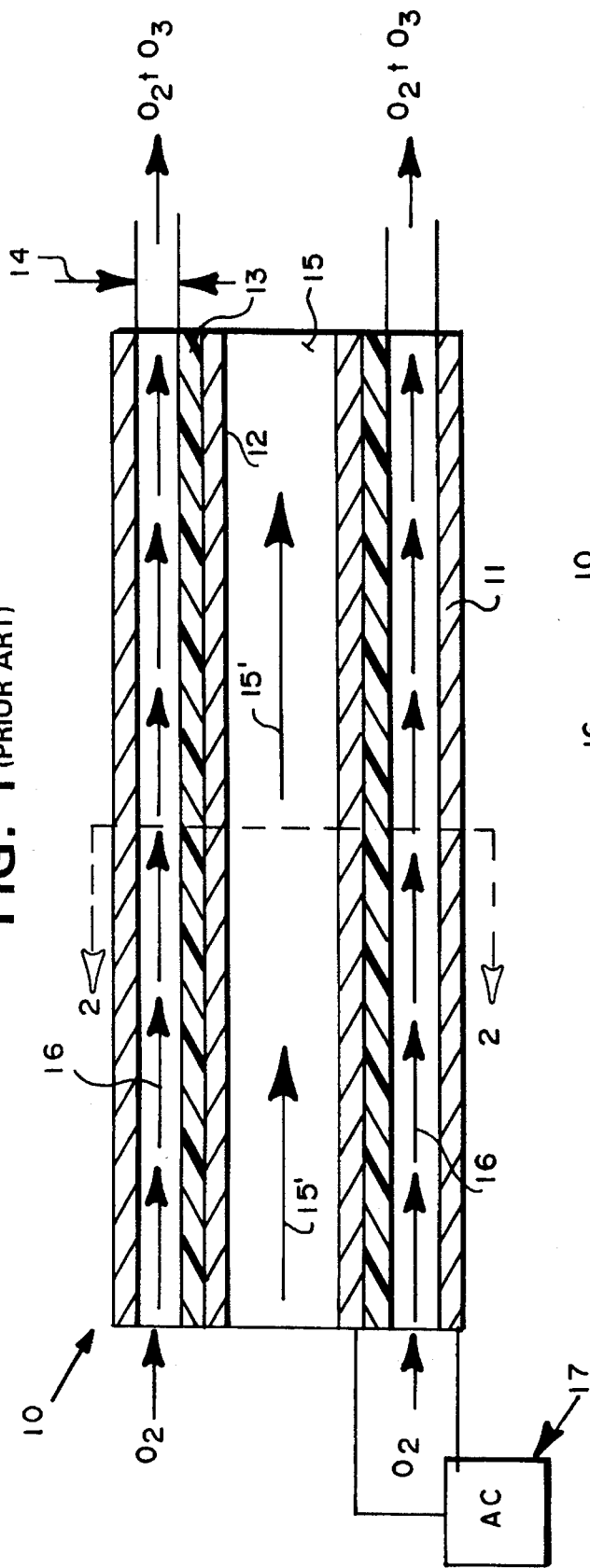
FIG. 1 is a schematic longitudinal cross-sectional view of an exemplary prior art tube-type ozone generator.
Figure 2:
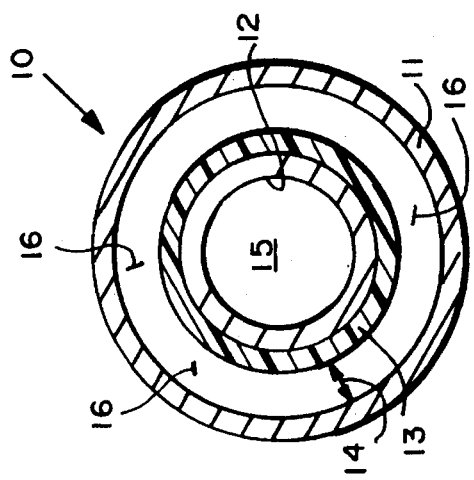
FIG. 2 is a schematic cross-sectional view of the prior art generator of FIG. 1 taken along lines 2—2 thereof.

FIGS. 1 and 2 show a conventional tube-type ozone generator 10, generally as illustrated in U.S. Pat. No. 4,988,484 (the disclosure of which has been incorporated by reference herein), which is designed to be arranged with a number of other similar tube-type ozone generators in banks within a common housing as shown in U.S. Pat. No. 4,988,484. The generator 10 includes an outer electrode 11, an inner electrode 12, a dielectric 13 disposed between the electrodes 11, 12 (shown on the exterior of the inner electrode 12 in FIGS. 1 and 2, but equally suitable on the inner surface of the outer electrode 11), and an annular passageway 14 defined between the electrodes 11, 12 and the dielectric 13. Typically the electrodes 11, 12 are made of 316L stainless steel, but may be made of any conducting material. The dielectric 13 is typically glass or ceramic, but any dielectric material with proper thermal resistance and electrical capacitance may be utilized.

In the generator 10, an interior passageway 15 is also provided, concentric with the inner electrode 12. A cooling fluid, such as nitrogen gas flowing in the direction of arrows 15' in FIG. 1, is circulated through the interior passageway 15, and the same cooling medium is typically also circulated exteriorly of the outer electrode 11. Oxygen-containing gas, such as ambient air or oxygen-enriched air sources up to and including pure oxygen (i.e. having an oxygen concentration of at least about 97%) is passed through the annular passageway 14 from one end of the generator 10 to the other in the direction of elongation indicated by arrows 16. Typically, the oxygen gas flow in the annular passageway 14 makes substantially a 0° angle with respect to the dimension of elongation of the passageway 14. Product gas is discharged from the end of the generator 10 opposite the end to which the oxygen-containing gas is introduced, the product gas containing oxygen and at least some quantity of ozone (e.g. at least 1%), and typically having an ozone concentration of up to about 14%. The oxygen-containing gas may be introduced at a pressure ranging from about atmospheric to about 10,000 psi, and the frequency of the AC power supplied by the power supply means 17 is between about 50–2500 Hz.

According to the apparatus of the present invention, illustrated in FIGS. 3 and 4, the power efficiency for generating a product gas having a particular concentration of ozone, can be dramatically increased. In FIGS. 3 and 4, the same reference numerals are used to illustrated the same components in FIGS. 1 and 2 only increased by ten. As can be seen in FIGS. 3 and 4, the basic apparatus may be virtually identical to that illustrated in FIGS. 1 and 2, the only difference being the particular way in which the oxygen-containing gas is introduced into, and passes through, the annular passageway 24.

As illustrated in FIGS. 3 and 4, the oxygen-containing gas is introduced making an angle α with respect to the dimension of elongation (indicated by reference numeral 16 in FIG. 3) of the passageway 24. The angle α is an angle greater than 0° and less than 90° which increases the power efficiency of the unit 20 compared to the unit 10 by causing the oxygen-containing gas to swirl as it passes in the passageway 24. Typically the angle α is about 45° to just less than 90°. The oxygen-containing gas swirls in a cyclonic flow pattern for essentially the entire time it is in the passageway 24, that is rotating about a center line of the generator 20 extending in the dimension of elongation 16 (that is rotating about the inner electrode 22), as it passes generally in the dimension of elongation 16 from the inlet end of the passageway 24 to the outlet end thereof.

The particular way in which the swirling action is initiated and/or continued in the generator 20 is not significant. Any structure that can induce and maintain the swirling action is suitable. In the exemplary embodiment illustrated in FIG. 3 a nozzle, shown schematically at 28, in the gas feed device, disposed at the angle α with respect to the dimension of elongation 16, at the inlet end of the passageway 24, is illustrated as the means for introducing oxygen-containing gas into the passageway 24 so that it swirls in the passageway 24. Alternatively a plurality of nozzles 28, a header, slanted passageways in the outer electrode 21 disposed along the length thereof, etc., could be utilized, or slots, channels, or orifices, or other gas feed device.

In the FIGS. 3 and 4 embodiment, the same components of the electrodes 21, 22, and dielectric 23, and the same cooling fluid (e.g. nitrogen gas) flowing as indicated at 25' in the interior passageway 25, and also exteriorly of the outer electrode 21, may be provided as in the FIGS. 1 and 2 embodiment. Also the AC source 27 provides AC power at a frequency between about 50–2500 Hz, while the oxygen-containing gas is passed through the annular passageway at a pressure from about 1–10,000 psi.

Figure 5:
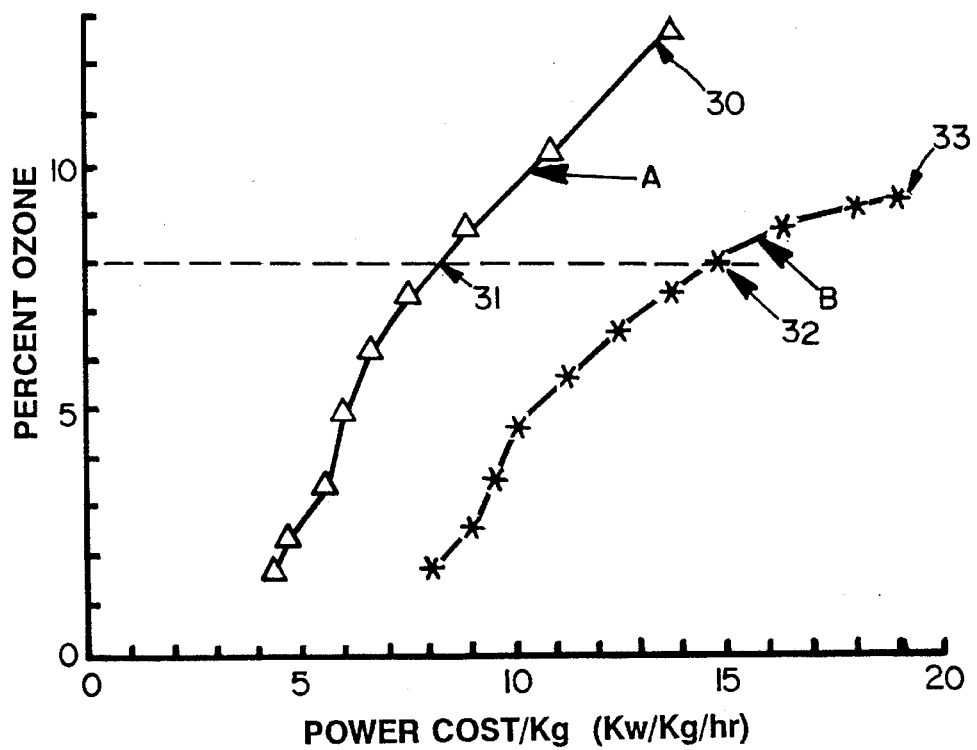
FIGS. 5 and 6 are graphical representations of results achievable according to the invention, utilizing the apparatus of FIGS. 3 and 4 compared to the apparatus of FIGS. 1 and 2 for otherwise substantially identical conditions.
Figure 6:
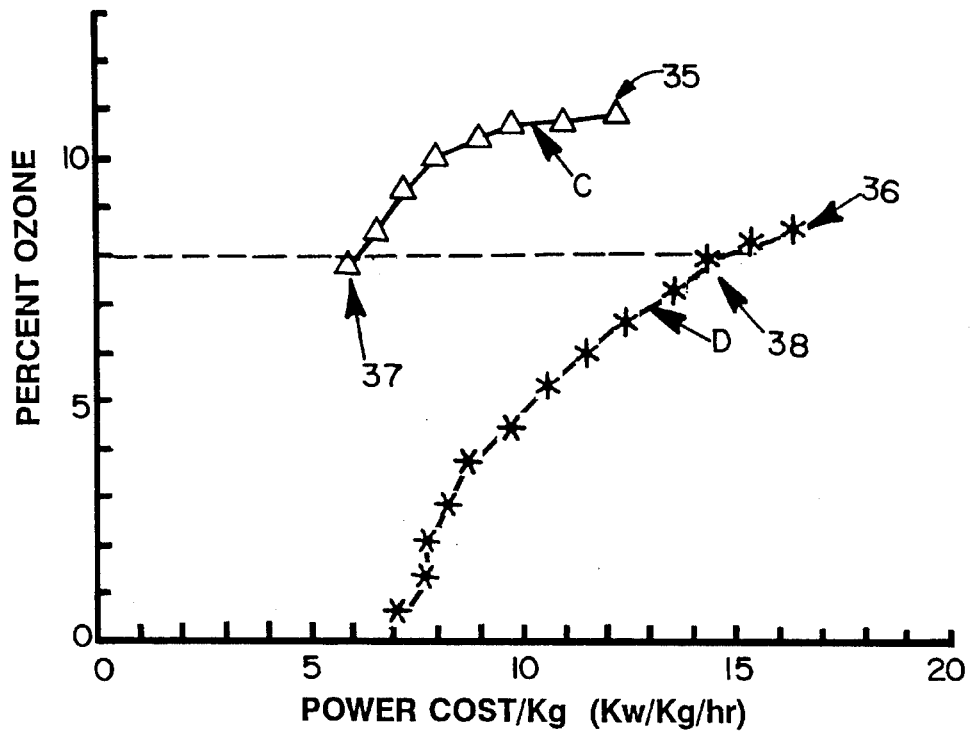

The results achievable utilizing the apparatus of FIGS. 3 and 4, practicing the method of producing ozone-containing product gas according to the present invention, are dramatic. These results are illustrated in FIGS. 5 and 6. The graph line A in FIG. 5 is the plot of data obtained from actual tests utilizing an ozone generator according to the invention, while plot B is obtained from tests utilizing the same generator only introducing the oxygen-containing gas conventionally (that is with a substantially 0° angle with respect to the dimension of elongation). Reference point 30 shows the maximum concentration of ozone in the product gas produced, which is close to 13%, while reference numeral 31 indicates the point of the plot A at 8% ozone concentration in the product gas. The point 32 is the point on the plot B at 8% ozone, while the point 33 is the maximum ozone percentage achieved, which was less than 10%.

The test conditions resulting in the graphical representations of FIG. 5, using essentially pure oxygen gas, with the angle α about 45°, are as follows:

TABLE 1

|  | B | A |
| --- | --- | --- |
| Oxygen Flow, std. liters/min | 5.92 | 5.38 |
| Oxygen Pressure, psi | 3.0 | 3.2 |
| Nitrogen Flow, std. liters/min | 21.62 | 19.7 |
| Nitrogen Pressure, psi | 6.0 | 1.8 |
| Power Frequency, Hz | 450 | 450 |

The nitrogen gas in Table 1 is the cooling fluid.

It will be seen from FIG. 5 that to produce product gas having an ozone concentration of about 8% it is approximately 50% cheaper (50% less power consumption) according to the invention than with substantially the same conditions according to the prior art. Also it is possible to obtain product gas having a concentration of ozone of greater than 10%, which was not possible according to the prior art conditions. FIG. 5 thus illustrates that according to the invention it is possible to obtain a product gas having an ozone concentration of at least about 8% with very high power efficiency, e.g. at a power cost of less than about 10 kw/kg/hr.

FIG. 6 shows a further graphical representation of the advantages of the invention in which a plot C, practicing the invention utilizing different conditions than those set forth in FIG. 5, is provided, while the plot D in FIG. 6 is a result of tests at substantially the same conditions as the plot C but according to conventional prior art (i.e. no swirling of the oxygen-containing gas). The maximum concentration, point 35 for the plot C is greater than 10% while the maximum concentration 36 for the plot D is less than 10%. Again, as in FIG. 5, the power costs, as indicated by point 37, for producing product gas according to the invention having an ozone concentration of 8% are about 50% of (actually less than 50% of) the power cost for 8% ozone product gas, indicated by point 38, for the plot D of the prior art.

The test data graphed in FIG. 6 were obtained from tests conducted utilizing essentially pure oxygen, with the angle α in the swirling embodiment according to the present invention of about 45°. The test conditions for FIG. 6 are as follows:

TABLE 2

|  | D | C |
| --- | --- | --- |
| Oxygen Flow, std. liters/min | 8.7 | 8.96 |
| Oxygen Pressure, psi | 3.0 | 4.0 |
| Nitrogen Flow, std. liters/min | 11.63 | 10.03 |
| Nitrogen Pressure, psi | 2.0 | 0.6 |
| Power Frequency, Hz | 450 | 450 |

Again, vastly greater power efficiency, and substantially greater possible ozone concentration in the product gas can be achieved according to the invention as seen by comparing plot C in FIG. 6 to the prior art of plot D for substantially the same conditions. Again it was possible to produce a product gas containing an ozone concentration of at least about 8% at less than about 10 kw/kg/hr.

It will thus be seen that according to the present invention a method and apparatus for producing ozone from oxygen-containing gas utilizing a tube-type ozone generator have been provided which greatly increase the power efficiency of the generator as well as allowing the production of a product gas having a higher percentage of ozone than is possible utilizing the same equipment according to prior art procedures. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and devices.

What is claimed is:

1. A method of generating ozone from an oxygen-containing gas utilizing a tube-type ozone generator having an inner electrode, outer electrode, and dielectric associated with one or both of the electrodes, and defining a smooth annular passageway elongated in a dimension of elongation, comprising the steps of:

(a) passing oxygen-containing gas through the annular passageway so that the gas makes an entrance angle into the annular passageway of greater than 0° and less than 90° with respect to the dimension of elongation so that the oxygen-containing gas swifts in a cyclonic flow pattern as it substantially linearly moves in the dimension of elongation; and (b) applying electrical power to the electrodes to create a corona discharge to generate ozone from some of the oxygen in the oxygen-containing gas, a product gas having at least eight percent ozone being discharged from the generator.

2. A method as recited in claim 1 wherein step (a) is practiced by passing essentially pure oxygen through the annular passageway at a pressure differential of as high as about 10,000 psi.

3. A method as recited in claim 2 wherein step (a) is practiced so that the amount of power applied in step (b) to produce a given percentage of ozone in the product gas is at least about 10% less than if step (a) were practiced under identical operating conditions by introducing the oxygen-containing gas so that it flowed in the dimension of elongation, without swirling, with all other conditions the same.

4. A method as recited in claim 3 wherein step (a) is practiced so that when the product gas has an ozone concentration of about 8% the amount of power utilized in the practice of step (b) is roughly about 50% less than if step (a) were practiced under identical operating conditions by introducing the oxygen-containing gas so that it flowed in the dimension of elongation, without swirling, with all other conditions the same.

5. A method as recited in claim 4 wherein step (a) is practiced by introducing and passing the oxygen-containing gas so that it makes an angle of about 45° to just less than 90° with respect to the dimension of elongation.

6. A method as recited in claim 3 wherein step (b) is practiced by applying AC power having a frequency of at least about 50 Hz.

7. A method as recited in claim 2 wherein steps (a) and (b) are practiced so that the product gas has an ozone concentration of at least 10%.

8. A method as recited in claim 7 wherein step (b) is practiced by applying AC power having a frequency of about 450–2000 Hz.

9. A method as recited in claim 1 wherein step (a) is practiced so that the amount of power applied in step (b) to produce a given percentage of ozone in the product gas is at least about 10% less than if step (a) were practiced by introducing the oxygen-containing gas so that it flowed in the dimension of elongation, without swirling, with all other conditions the same.

10. A method as recited in claim 9 wherein step (a) is practiced so that when the product gas has an ozone concentration of about 8% the amount of power utilized in the practice of step (b) is roughly about 50% less than if step (a) were practiced by introducing the oxygen-containing gas so that it flowed in the dimension of elongation, without swirling, with all other conditions the same.

11. A method as recited in claim 10 wherein step (a) is practiced by introducing and passing the oxygen-containing gas so that it makes an angle of about 45° to just less than 90° with respect to the dimension of elongation.

12. A method as recited in claim 9 wherein step (b) is practiced by applying AC power having a frequency of at least 50 Hz.

13. A method as recited in claim 1 wherein step (a) is practiced by introducing and passing the oxygen-containing gas so that it makes an angle of about 45° to just less than 90° with respect to the dimension of elongation.

14. A method as recited in claim 1 wherein steps (a) and (b) are practiced so that the dimension of elongation is approximately horizontal.

15. A method as recited in claim 1 wherein the generator has an interior passageway substantially concentric with the inner electrode, and comprising the further step (c) of passing a cooling fluid through the interior passageway.

16. A method as recited in claim 15 wherein step (c) is practiced by passing nitrogen gas through the interior passageway either co-current or countercurrent to the general direction of oxygen-containing gas flow through the annular passageway.

17. A method of generating ozone-containing gas utilizing a generator having inner and outer electrodes, with a dielectric associated with one or both of the electrodes, defining an annular passageway extending linearly in a direction of elongation and having first and second ends spaced from each other in a substantially straight line in the direction of elongation, comprising the steps of:

(a) introducing essentially pure oxygen gas into the passageway so that it flows from the first end of the passageway to the second end, moving substantially linearly in the dimension of elongation as it rotates around an axis defined by the dimension of elongation;

(b) applying AC power to the generator electrodes so as to produce a corona discharge causing some of the oxygen flowing in the passageway to be transformed to ozone, so that a product gas is produced having ozone therein; and wherein steps (a) and (b) are practiced so that the product gas has an ozone concentration of at least about 8% at a power cost of less than about ten kw/kg/hr.

18. A method as recited in claim 17 wherein the generator has an interior passageway substantially concentric with the inner electrode, and comprising the further step (c) of passing a cooling fluid through the interior passageway.

19. A method as recited in claim 18 wherein step (c) is practiced by passing nitrogen gas or other cooling fluid through the interior passageway either co-current or countercurrent to the general direction of oxygen-containing gas flow through the annular passageway.

20. A method as recited in claim 18 wherein step (a) is practiced by introducing and passing the oxygen gas so that it makes an angle of about 45° to just less than 90° with respect to the direction of elongation, swirling as it moves from the first end of the annular passageway to the second end thereof.

21. A method as recited in claim 20 wherein step (b) is practiced to apply AC power at a frequency of about 400–700 Hz.

22. A method as recited in claim 21 wherein steps (a) and (b) are further practiced to produce a product gas having an ozone concentration of about 10%.

23. A method as recited in claim 20 wherein steps (a) and (b) are further practiced so that the power cost to produce product gas containing at least about 8% ozone is roughly about 50% of the power cost to produce product gas with that concentration of ozone using the same generator under the same conditions only with the oxygen gas flowing substantially in the direction of elongation without swirling.

24. An ozone generator, comprising:

an inner electrode;

an outer electrode;

a dielectric associated with one of said electrodes;

said electrodes and dielectric defining a smooth annular passageway having a first end and a second end spaced from each other in a direction of elongation;

means for introducing oxygen containing gas into said first end of said annular passageway so that the gas makes an entrance angle into said annular passageway of greater than 0° and less 90° with respect to the direction of elongation, so that the introduced oxygen containing gas rotates around an axis defined by the dimension of elongation as it substantially linearly moves in the dimension of elongation in the annular passageway as it passes from the first end to the second end thereof; and means for applying AC power to said electrodes.

25. An ozone generator as recited in claim 24 wherein said means for introducing oxygen-containing gas comprises at least one gas-feed device disposed at about said angle with respect to said direction of elongation.

26. An ozone generator as recited in claim 24 wherein said means for introducing oxygen-containing gas comprises means for introducing oxygen-containing gas at an angle of about 45°–90° with respect to the direction of elongation.

27. An ozone generator as recited in claim 26 further comprising an interior passageway substantially concentric with and interior of said inner electrode; and means for circulating a cooling fluid through said interior passageway, and externally of said outer electrode.

28. An ozone generator as recited in claim 24 wherein said means for applying AC power to said generator comprises means for applying power at a frequency of between about 50–2500 Hz.

* * * * *